(12) United States Patent
Ozasa et al.

(10) Patent No.: US 10,328,856 B2
(45) Date of Patent: **\*Jun. 25, 2019**

(54) IMAGE PROCESSING DEVICE, IMAGE PROCESSING METHOD, AND ON-VEHICLE APPARATUS

(71) Applicant: DENSO TEN Limited, Kobe-shi, Hyogo (JP)

(72) Inventors: Takayuki Ozasa, Kobe (JP); Teruhiko Kamibayashi, Kobe (JP); Kohji Ohnishi, Kobe (JP); Takeo Matsumoto, Kobe (JP); Tomoyuki Fujimoto, Kobe (JP); Daisuke Yamamoto, Kobe (JP)

(73) Assignee: DENSO TEN Limited, Kobe (JP)

( * ) Notice: Subject to any disclaimer, the term of this patent is extended or adjusted under 35 U.S.C. 154(b) by 37 days.

This patent is subject to a terminal disclaimer.

(21) Appl. No.: 15/091,380

(22) Filed: Apr. 5, 2016

(65) Prior Publication Data

US 2016/0311372 A1 Oct. 27, 2016

(30) Foreign Application Priority Data

Apr. 24, 2015 (JP) ................. 2015-089738

(51) Int. Cl.
*B60R 1/00* (2006.01)
*G06T 11/00* (2006.01)

(52) U.S. Cl.
CPC ............... *B60R 1/00* (2013.01); *G06T 11/00* (2013.01); *B60R 2300/305* (2013.01); *B60R 2300/60* (2013.01); *B60R 2300/605* (2013.01)

(58) Field of Classification Search
None
See application file for complete search history.

(56) References Cited

U.S. PATENT DOCUMENTS

| 5,710,875 | A | * | 1/1998 | Harashima | G06T 15/10 345/419 |
| 5,831,619 | A | * | 11/1998 | Nakagawa | G06T 1/60 345/419 |
| 7,812,741 | B2 | * | 10/2010 | Sakakibara | G08G 1/168 340/932.2 |
| 9,031,343 | B2 | * | 5/2015 | Venkataraman | G06T 9/00 382/250 |

(Continued)

FOREIGN PATENT DOCUMENTS

| CN | 101191728 A | 6/2008 |
| JP | 2006-171849 A | 6/2006 |

(Continued)

*Primary Examiner* — Reza Aghevli
(74) *Attorney, Agent, or Firm* — Oliff PLC

(57) ABSTRACT

An image processing device according to an aspect of the embodiment includes an image generating unit that generates an image at a virtual viewpoint based on a captured image of an image capturing unit, and an image processing unit that generates an image in which an image for synthesis is displayed on the image at the virtual viewpoint. The image processing unit performs a process for decreasing visibility of the image for synthesis when the image at the virtual viewpoint is an image at a viewpoint location of the virtual viewpoint while the viewpoint location is moving.

6 Claims, 5 Drawing Sheets

(56) References Cited

U.S. PATENT DOCUMENTS

| | | | |
|---|---|---|---|
| 2008/0122654 A1* | 5/2008 | Sakakibara | B62D 15/0275 340/932.2 |
| 2008/0129756 A1* | 6/2008 | Iwano | B60R 1/00 345/632 |
| 2012/0069131 A1* | 3/2012 | Abelow | G06Q 10/067 348/14.01 |
| 2012/0069188 A1* | 3/2012 | Ohno | B60R 1/00 348/148 |
| 2013/0009950 A1* | 1/2013 | Ben-David | G06T 15/04 345/419 |
| 2013/0071012 A1* | 3/2013 | Leichsenring | G06K 9/80 382/154 |
| 2013/0077880 A1* | 3/2013 | Venkataraman | G06T 9/00 382/232 |
| 2013/0278727 A1* | 10/2013 | Tamir | H04N 13/261 348/47 |
| 2013/0307935 A1* | 11/2013 | Rappel | A61B 1/00048 348/46 |
| 2014/0327666 A1* | 11/2014 | Suzuki | G06T 19/006 345/419 |
| 2015/0085089 A1* | 3/2015 | Shigemura | G02B 27/2214 348/54 |
| 2016/0044252 A1* | 2/2016 | Molina | H04N 5/2258 348/208.6 |
| 2016/0309084 A1* | 10/2016 | Venkataraman | H04N 5/23232 |

FOREIGN PATENT DOCUMENTS

| | | |
|---|---|---|
| JP | 2011-244239 A | 12/2011 |
| JP | 2011-251681 A | 12/2011 |
| WO | 2009/144994 A1 | 12/2009 |

* cited by examiner

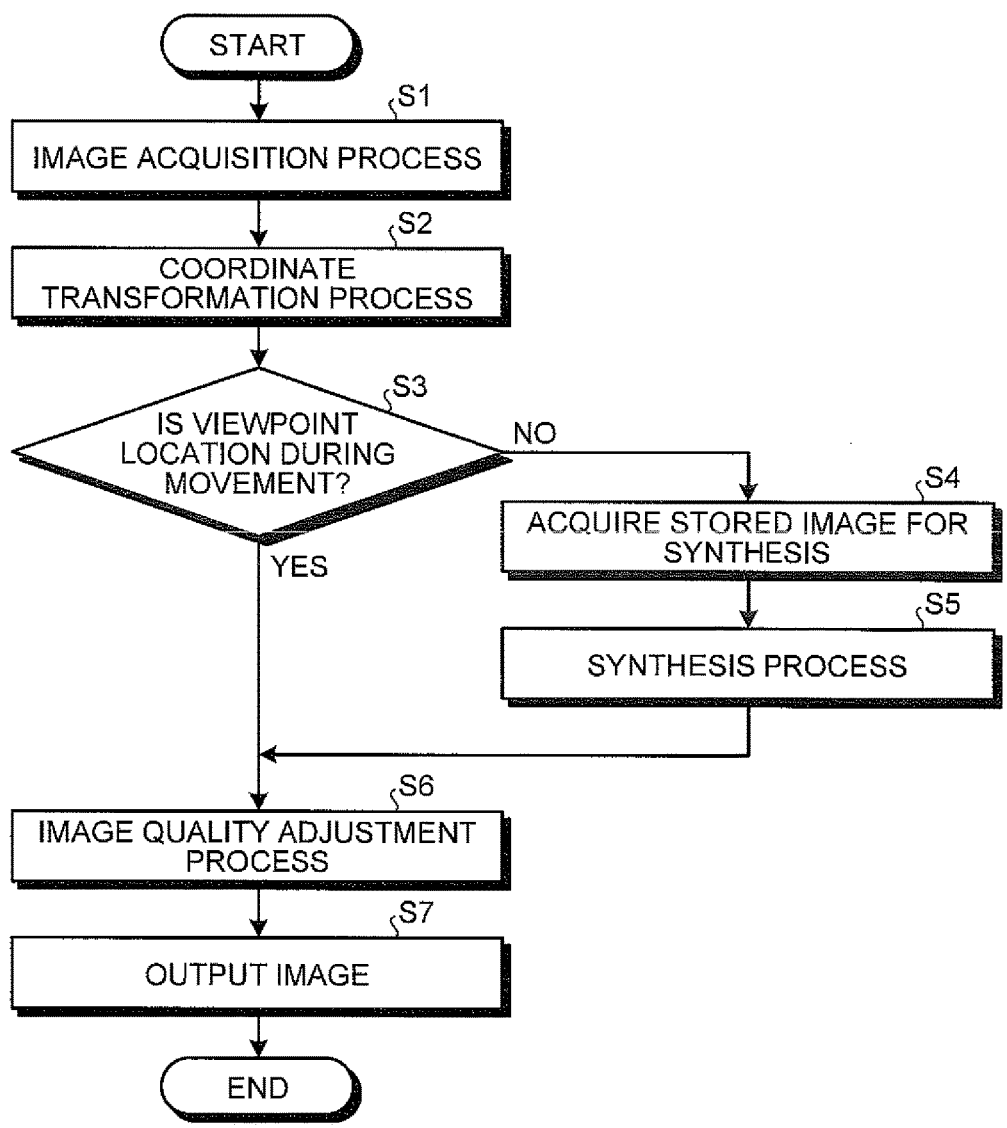

IMAGE PROCESSING DEVICE, IMAGE PROCESSING METHOD, AND ON-VEHICLE APPARATUS

CROSS-REFERENCE TO RELATED APPLICATION

This application is based upon and claims the benefit of priority of the prior Japanese Patent Application No. 2015-089738, filed on Apr. 24, 2015, the entire contents of which are incorporated herein by reference.

FIELD

The embodiment discussed herein is directed to an image processing device, an image processing method, and an on-vehicle apparatus.

BACKGROUND

There is known a conventional technology for generating a virtual viewpoint image and displaying the virtual viewpoint image on a display means. Herein, the virtual viewpoint image is an image viewed from a virtual viewpoint on the basis of a peripheral image of a vehicle captured by an image capturing means placed at the predetermined position of the vehicle (for example, see Japanese Laid-open Patent Publication No. 2011-244239).

However, the conventional technology is to display only the virtual viewpoint image. If it is possible to more appropriately perform display using virtual viewpoint images, it is considered that its convenience is improved.

SUMMARY

According to an aspect of an embodiment, an image processing device includes an image generating unit and an image processing unit. The image generating unit that generates an image at a virtual viewpoint based on a captured image of an image capturing unit. The image processing unit that generates an image in which an image for synthesis is displayed on the image at the virtual viewpoint. The image processing unit performs a process for decreasing visibility of the image for synthesis when the image at the virtual viewpoint is an image at a viewpoint location of the virtual viewpoint while the viewpoint location is moving.

BRIEF DESCRIPTION OF DRAWINGS

A more complete appreciation of the embodiment and many of the attendant advantages thereof will be readily obtained as the same becomes better understood by reference to the following detailed description when considered in connection with the accompanying drawings, wherein:

FIG. 7 is a flowchart illustrating an image processing procedure that is executed by an image processing device.

DESCRIPTION OF EMBODIMENT

Hereinafter, an embodiment of an image processing device, an image processing method, and an on-vehicle apparatus according to the present application will be explained in detail with reference to the drawings. Moreover, the invention is not limited to the following embodiment.

1. Image Processing Method

Figure 1A:
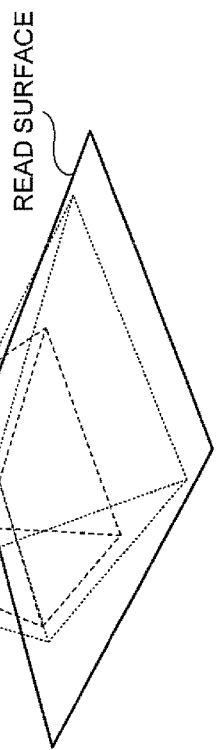
FIGS. 1A and 1B are diagrams explaining an image processing method according to an embodiment.
Figure 1B:
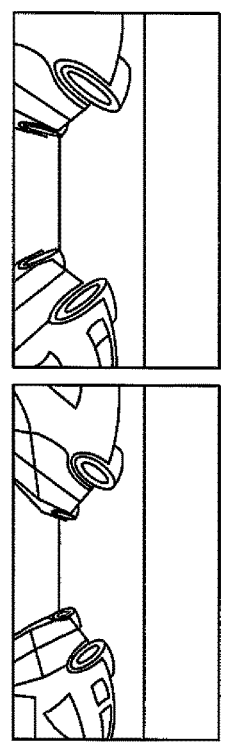

FIGS. 1A and 1B are diagrams explaining an image processing method according to an embodiment. The image processing method is performed by, for example, a vehicular image processing device (hereinafter, referred to as image processing device) mounted on a vehicle.

As illustrated in FIG. 1A, the image processing device according to the embodiment generates an image (hereinafter, referred to as virtual viewpoint image) viewed from a virtual viewpoint on the basis of an image (hereinafter, referred to as captured image) captured by an image capturing device (not illustrated: example of image capturing unit) that is provided at the predetermined position of the vehicle to capture a peripheral image of the vehicle.

Furthermore, the image processing device generates a synthesized image obtained by synthesizing the virtual viewpoint image and an image for synthesis and outputs the synthesized image onto a display device (example of display unit), so as to display on the display device an image in which the image for synthesis is displayed on the virtual viewpoint image.

The image for synthesis is an image that acts as an index for drive assist. For example, the image for synthesis is an image of a guideline, a warning image, an image indicating a parking space, or the like. The image for synthesis is generated by, for example, an image generating device (not illustrated) and is output to the image processing device.

The guideline image is, for example, an image of a guideline that indicates a running path of the vehicle, in which the running path is predicted based on a rudder angle or the like detected by a rudder angle sensor (not illustrated) provided in the vehicle. The warning image is, for example, is an image for warning an occupant of the position of an obstacle when the obstacle exists in the rear of the vehicle. For example, the warning image is an image of an enclosing line that encloses the obstacle. In this case, because the position of the guideline, the obstacle, or the parking space is changed in accordance with the change in a virtual viewpoint, the image generating device generates an image for synthesis in accordance with the change in the virtual viewpoint.

When an image for synthesis is synthesized with a virtual viewpoint image of which the viewpoint location of the virtual viewpoint is moving, the image processing device displays together the image for synthesis and the virtual viewpoint image while sequentially changing the viewpoint location. Therefore, because an occupant of the vehicle visually recognizes the changes of the virtual viewpoint image and the image for synthesis separately, it is likely that the occupant cannot grasp the images and also cannot grasp a sense of distance or the like.

When a virtual viewpoint image is images at viewpoint locations while the virtual viewpoint is moving, the image processing device performs a process for decreasing visibility of images for synthesis. As a result, the occupant of the vehicle can easily grasp an image, a sense of distance, and the like.

For example, as illustrated in FIG. 1B, when a virtual viewpoint image is images at viewpoint locations A and B before and after the virtual viewpoint is moved, the image processing device outputs to the display device images in which images for synthesis are displayed on virtual viewpoint images. On the other hand, when the virtual viewpoint image are images at viewpoint locations while the virtual viewpoint is moving, the image processing device outputs to the display device images in which images for synthesis are not displayed on virtual viewpoint images.

The process for decreasing visibility of an image for synthesis is not limited to a process for outputting only the virtual viewpoint image to the display device to zero visibility of the image for synthesis without the synthesis of the image for synthesis. For example, the process for decreasing visibility of an image for synthesis includes a process for outputting to the display device an image obtained by synthesizing a virtual viewpoint image and an image for synthesis having high transmittance. Hereinafter, an example of the process for outputting a virtual viewpoint image to the display device without the synthesis of an image for synthesis will be explained in detail.

2. Configuration of On-Vehicle Apparatus

Figure 2:
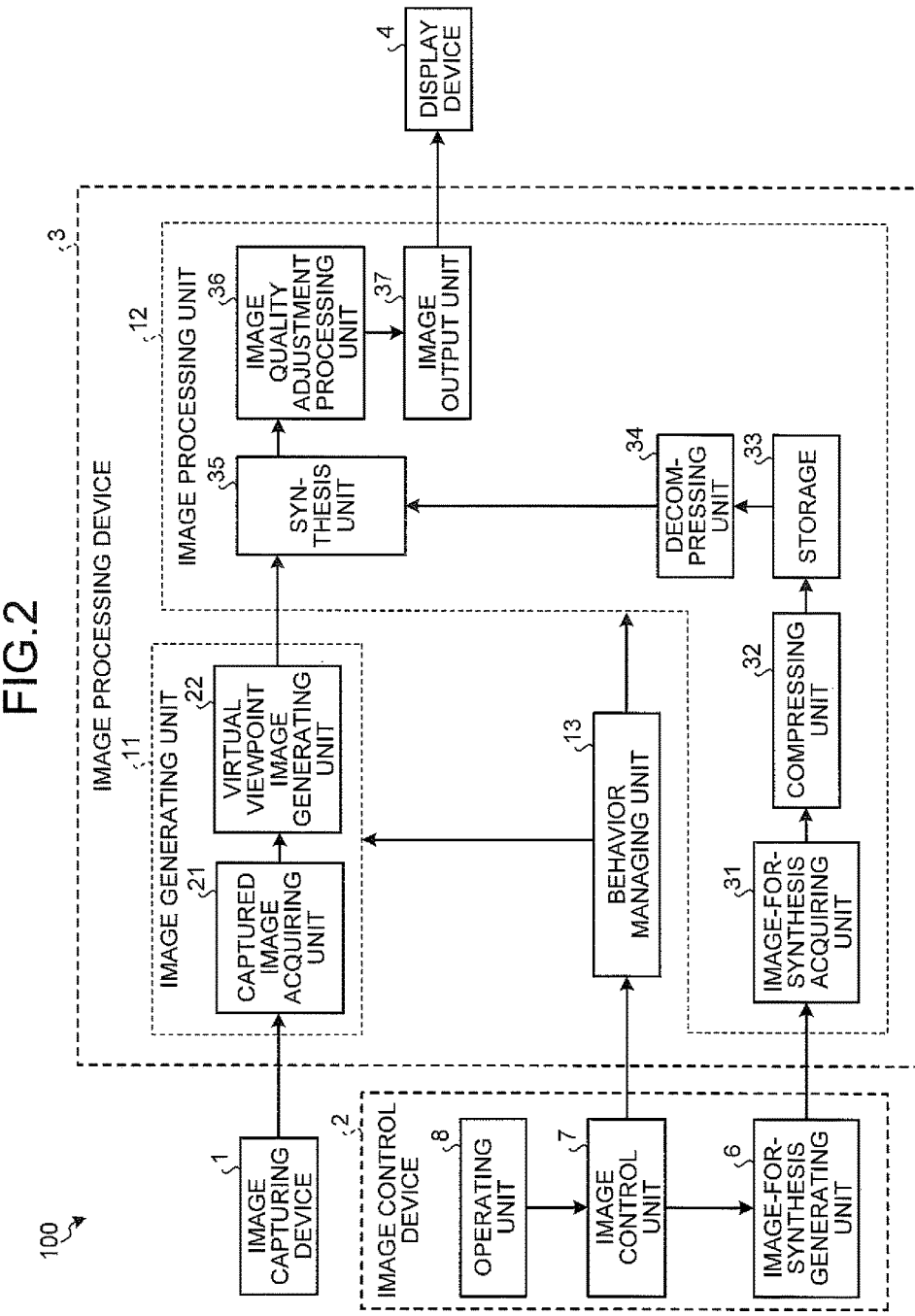
FIG. 2 is a diagram illustrating a configuration example of an on-vehicle apparatus according to the embodiment.

FIG. 2 is a diagram illustrating a configuration example of an on-vehicle apparatus 100 according to the embodiment. As illustrated in FIG. 2, the on-vehicle apparatus 100 includes an image capturing device 1 (example of image capturing unit), an image control device 2, an image processing device 3, and a display device 4 (example of display unit). Herein, the image processing device 3 may have, for example, a configuration that it includes at least one of the image control device 2 and the display device 4.

Figure 3:
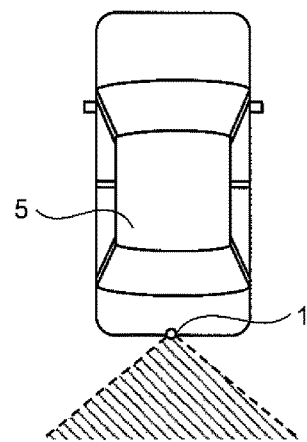
FIG. 3 is a diagram illustrating an arrangement example of an image capturing device.

The image capturing device 1 includes, for example, includes an image capturing element such as a Charge Coupled Device (CCD) and a Complementary Metal Oxide Semiconductor (CMOS). The image capturing device 1 outputs to the image processing device 3 a captured image that is a moving image captured by the image capturing element. For example, as illustrated in FIG. 3, the image capturing device 1 is arranged in the rear of a vehicle 5 to capture a rear image of the vehicle 5. FIG. 3 is a diagram illustrating an arrangement example of the image capturing device 1. It should be noted that the arrangement of the image capturing device 1 and the number of image capturing devices are not limited to the example illustrated in FIG. 3.

The image control device 2 includes an image-for-synthesis generating unit 6, an image control unit 7, and an operating unit 8. The image-for-synthesis generating unit 6 generates and outputs an image for synthesis for performing chroma key synthesis on a virtual viewpoint image. The image for synthesis is an image that acts as an index for drive assist. For example, the image for synthesis is an image of a guideline and a warning image.

For example, when generating an image of a guideline, the image-for-synthesis generating unit 6 acquires information such as a rudder angle detected by a rudder angle sensor (not illustrated) provided in the vehicle, and predicts a running path of the vehicle on the basis of the rudder angle or the like. The image-for-synthesis generating unit 6 generates the image of the guideline that indicates the predicted running path.

For example, when generating a warning image, the image-for-synthesis generating unit 6 analyzes the captured image of the image capturing device 1, and detects an obstacle in the rear of the vehicle. The image-for-synthesis generating unit 6 generates the warning image to warn an occupant of the vehicle of the presence of the obstacle. For example, the warning image is an image for warning the occupant of the position of the obstacle, or is an image of an enclosing line that encloses the obstacle.

The image control unit 7 controls the image processing device 3 and the image-for-synthesis generating unit 6 on the basis of input operations to the operating unit 8, for example. When there is a request for the change in a virtual viewpoint through an input operation to the operating unit 8, the image control unit 7 performs a change process on the virtual viewpoint.

For example, when there is a change request from a viewpoint location (hereinafter, referred to as viewpoint location A) of the present virtual viewpoint to a viewpoint location (hereinafter, referred to as viewpoint location B) of a destination after change, the image control unit 7 outputs information on the viewpoint location B to the image-for-synthesis generating unit 6 and the image processing device 3.

The image-for-synthesis generating unit 6 generates an image for synthesis corresponding to the viewpoint location B on the basis of the information on the viewpoint location B output from the image control unit 7, and outputs the image for synthesis to the image processing device 3. Moreover, on the basis of the information on the viewpoint location B output from the image control device 2, the image processing device 3 generates virtual viewpoint images that are images viewed from sequential viewpoint locations up to the viewpoint location B.

The image processing device 3 acquires the captured image from the image capturing device 1 and also acquires the image for synthesis from the image control device 2. The image processing device 3 generates an image at a virtual viewpoint (hereinafter, referred to as virtual viewpoint image) on the basis of the acquired captured image, performs chroma key synthesis on the virtual viewpoint image and the image for synthesis, and outputs the generated synthesized image to the display device 4.

The display device 4 includes a Liquid Crystal Display (LCD), and displays the synthesized image and the virtual viewpoint image on the basis of data of the synthesized image and the virtual viewpoint image acquired from the image processing device 3.

3. Configuration of Image Processing Device 3

As illustrated in FIG. 2, the image processing device 3 includes an image generating unit 11, an image processing unit 12, and a behavior managing unit 13. The behavior managing unit 13 may be individually provided in the image generating unit 11 and the image processing unit 12.

The image generating unit 11 performs a coordinate transformation process on the captured image output from the image capturing device 1 to generate a virtual viewpoint image that is an image viewed from a virtual viewpoint, and outputs the virtual viewpoint image to the image processing unit 12. The image processing unit 12 acquires the image for synthesis from the image control device 2 and synthesizes the image for synthesis and the virtual viewpoint image, and then outputs a synthesized image to the display device 4. The behavior managing unit 13 manages behaviors of the image generating unit 11 and the image processing unit 12.

The image processing device 3 is a device implemented by an integrated circuit such as an Application Specific Integrated Circuit (ASIC) and a Field Programmable Gate Array (FPGA). Alternatively, the image processing device 3 may have a configuration that it includes a processor such as CPU and MPU and a storage such as a semiconductor memory device, such as a Random Access Memory (RAM) and a flash memory, in which the processor executes a program stored in the storage to realize the functions of the described units.

The image generating unit 11 includes a captured image acquiring unit 21 and a virtual viewpoint image generating unit 22. The captured image acquiring unit 21 acquires the captured image from the image capturing device 1. For example, the image capturing device 1 outputs data of the captured image (hereinafter, referred to as captured image data) to the image processing device 3 by using a video signal such as an RGB signal and a component signal.

Upon acquiring the captured image data from the image capturing device 1, the captured image acquiring unit 21 outputs the acquired captured image data to the virtual viewpoint image generating unit 22. Herein, the captured image data is data corresponding to an image of each frame of the moving image captured by the image capturing device 1. The captured image data are serially output in units of frame of the captured moving image from the captured image acquiring unit 21 to the virtual viewpoint image generating unit 22.

The virtual viewpoint image generating unit 22 performs the coordinate transformation process on the captured image to generate a virtual viewpoint image that is an image viewed from a virtual viewpoint, and outputs data of the virtual viewpoint image (hereinafter, referred to as virtual viewpoint image data) to the synthesis unit 35.

In the coordinate transformation process, the virtual viewpoint image generating unit 22 projects (maps), for example, the captured image on a predetermined projection plane, and sets, among captured images projected on the predetermined projection plane, an image in an area within a predetermined viewing angle from the virtual viewpoint as the virtual viewpoint image.

The predetermined projection plane may be, for example, a three-dimensional curved surface in a virtual three-dimensional space, or be a road surface illustrated in FIG. 1A. Moreover, the projection of a captured image on the predetermined projection plane can be performed, for example, by transforming the coordinate of the captured image in which the image capturing device 1 is utilized as an origin coordinate into a coordinate system in which the projection plane is utilized as a reference.

The image processing unit 12 includes an image-for-synthesis acquiring unit 31, a compressing unit 32, a storage 33, a decompressing unit 34, a synthesis unit 35, an image quality adjustment processing unit 36, and an image output unit 37.

The image-for-synthesis acquiring unit 31 acquires the image for synthesis from the image control device 2. The image control device 2 outputs data of the image for synthesis (hereinafter, referred to as image data for synthesis) to the image processing device 3 by using a video signal such as an RGB signal and a component signal, for example. Upon acquiring the image data for synthesis from the image control device 2, the image-for-synthesis acquiring unit 31 outputs the acquired image data for synthesis to the compressing unit 32.

The compressing unit 32 compresses the image data for synthesis by using a predetermined compression process, and stores the compressed image data for synthesis (hereinafter, referred to as compressed image data) in the storage 33. For example, when a previously designated color is used for the image data for synthesis, the compressing unit 32 can perform data compression by using a Color Look-Up Table (CLUT), and can further compress the compressed data by using a run-length method. It should be noted that the compressing unit 32 may perform the other compression processes in place of the CLUT and run-length method.

The decompressing unit 34 performs a process for decompressing the compressed image data stored in the storage 33 to image data for synthesis. For example, the decompressing unit 34 performs reverse conversion on the compressed image data stored in the storage 33 by using the run-length method and further performs reverse conversion by using the CLUT, so as to decompress the compressed image data to the image data for synthesis.

On the basis of the virtual viewpoint image data acquired from the image generating unit 11 and the image data for synthesis acquired from the decompressing unit 34, the synthesis unit 35 generates data of a synthesized image (hereinafter, referred to as synthesized image data) obtained by synthesizing the image for synthesis on the virtual viewpoint image by using chroma key synthesis. For example, the synthesis unit 35 sets, among pixels that constitute the image for synthesis, a color of a pixel corresponding to a previously designated color (for example, blue) as a transparent color, and then synthesizes the image for synthesis on the virtual viewpoint image.

The synthesis unit 35 switches on or off the synthesis function for synthesizing the virtual viewpoint image and the image for synthesis in accordance with a request from the behavior managing unit 13, for example. When the synthesis function is switched on, the synthesis unit 35 synthesizes the image for synthesis on the virtual viewpoint image. When the synthesis function is switched off, the synthesis unit 35 does not synthesize the virtual viewpoint image and the image for synthesis and outputs the virtual viewpoint image data acquired from the image generating unit 11 to the image quality adjustment processing unit 36.

Figure 4:
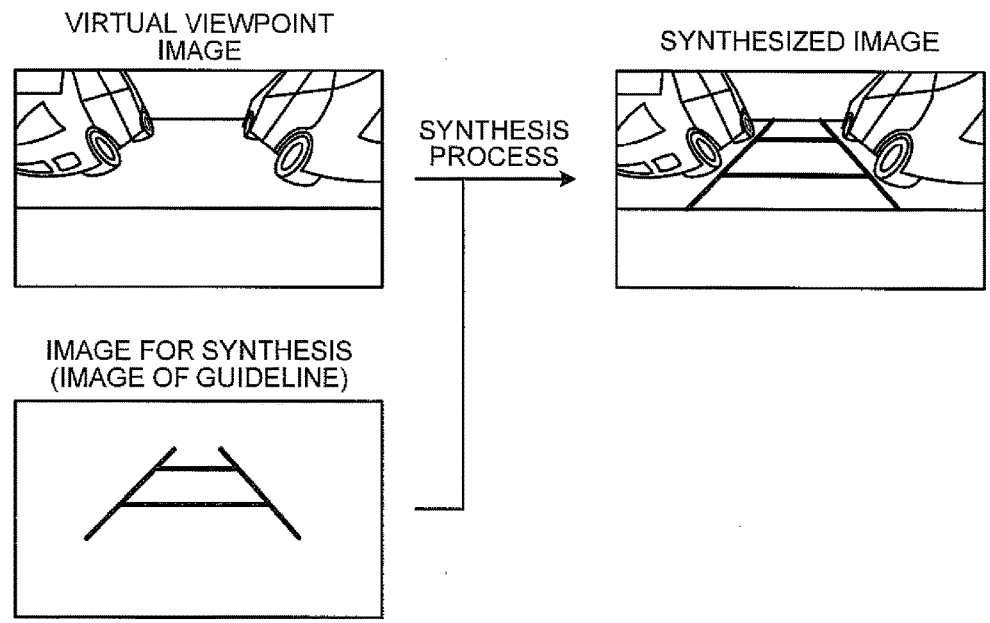
FIG. 4 is a diagram explaining a synthesis process that is performed by a synthesis unit when an image of a guideline is employed as an image for synthesis.

FIG. 4 is a diagram explaining the synthesis process that is performed by the synthesis unit 35 when an image of a guideline is employed as the image for synthesis. In the example illustrated in FIG. 4, the synthesis unit 35 generates a synthesized image obtained by synthesizing an image of a guideline on the virtual viewpoint image. By using the synthesized image, the occupant of the vehicle can see the virtual viewpoint image on which the guideline is superimposed, and thus can drive the vehicle more appropriately.

The image quality adjustment processing unit 36 performs a process for adjusting an image quality of the image output from the synthesis unit 35, and outputs to the image output unit 37 data of the image after the image quality adjustment process is completed. The image output unit 37 converts the data of the image output from the image quality adjustment processing unit 36 into a video signal format that can be received by the display device 4, and outputs the converted data to the display device 4.

On the basis of information on the viewpoint location B as the movement destination output from the image control device 2, the behavior managing unit 13 outputs to the image generating unit 11 sequential viewpoint locations (hereinafter, referred to as $C_1$ to $C_n$: n is natural number) up to the after-movement viewpoint location B. As a result, the image generating unit 11 sequentially generates and outputs virtual viewpoint images at the sequential viewpoint locations $C_1$ to $C_n$ (hereinafter, may be collectively referred to as viewpoint locations C) between the before-movement viewpoint location A and the after-movement viewpoint location B.

Figure 5:
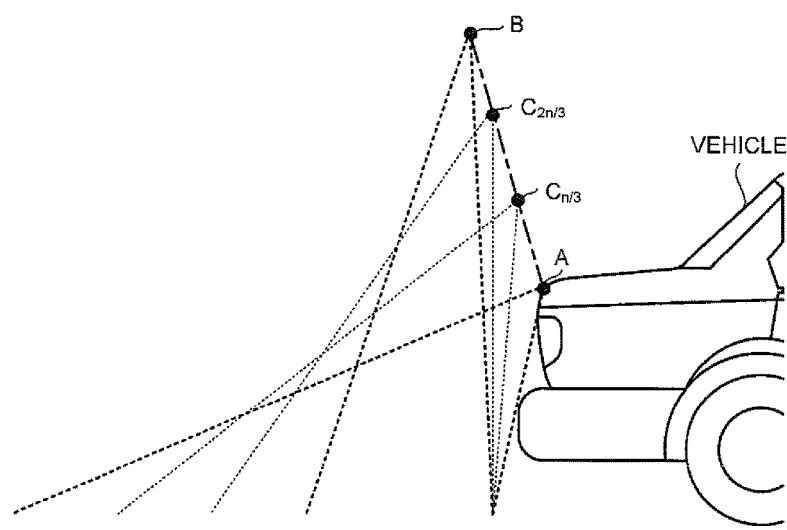
FIG. 5 is a diagram illustrating an example of viewpoint locations when a viewpoint is sequentially moved from a viewpoint location as a start point to a viewpoint location as an end point.

FIG. 5 is a diagram explaining the viewpoint locations A, $C_1$ to $C_n$, and B when a viewpoint is sequentially moved from the viewpoint location A to the viewpoint location B. In FIG. 5, only the viewpoint locations $C_{n/3}$ and $C_{2n/3}$ among the viewpoint locations $C_1$ to $C_n$ are illustrated for descriptive purposes. In the example illustrated in FIG. 5, the viewpoint location becomes higher with the movement of the viewpoint from the viewpoint location A the viewpoint location B.

The number of the viewpoint locations C between the viewpoint locations A and B is the number of virtual viewpoint images at viewpoint locations that sequentially move between the viewpoint locations A and B, in which the occupant of the vehicle can visually recognize the virtual viewpoint images in a seamless way, for example. Alternatively, the number of the viewpoint locations C may be the number of virtual viewpoint images that can be visually recognized in a frame-by-frame way.

Returning to FIG. 2, the behavior managing unit 13 will be subsequently explained. The behavior managing unit 13 can control whether an image obtained by displaying the image for synthesis on the virtual viewpoint image is output from the image processing unit 12 to the display device 4, or not the virtual viewpoint image on which the image for synthesis is not displayed is output from the image processing unit 12 to the display device 4.

When virtual viewpoint images at the viewpoint locations A and B are output from the image generating unit 11, the behavior managing unit 13 causes the image processing unit 12 to generate and output images obtained by synthesizing images for synthesis on the virtual viewpoint images. On the other hand, when virtual viewpoint images at the viewpoint locations C are output from the image generating unit 11, the behavior managing unit 13 causes the image processing unit 12 to output to the display device 4 the virtual viewpoint images on which images for synthesis are not synthesized.

Figure 6:
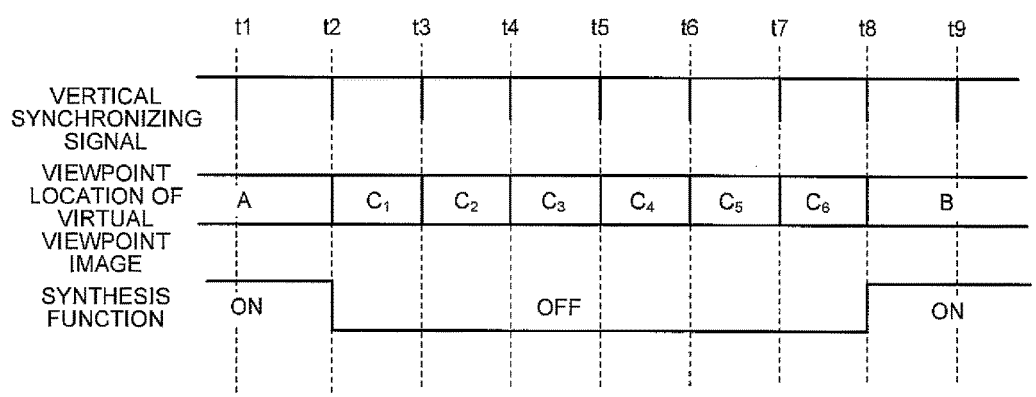
FIG. 6 is a diagram explaining processing details performed by an image processing unit when a virtual viewpoint is moved.

FIG. 6 is a diagram explaining processing details performed by the image processing unit 12 when a virtual viewpoint moves from the viewpoint location A to the viewpoint location B. In FIG. 6, a vertical synchronizing signal, a viewpoint location of a virtual viewpoint image, and ON/OFF of a synthesis function by the synthesis unit 35 are illustrated in association with one another.

FIG. 6 illustrates an example that the behavior managing unit 13 acquires information on the viewpoint location B as a movement destination from the image control device 2 before time t2 and changes a viewpoint location from time t2 on the basis of the information. The vertical synchronizing signal illustrated in FIG. 6 is illustrated for descriptive purposes to separate images in units of frame.

As illustrated in FIG. 6, up to time t2, the behavior managing unit 13 causes the image generating unit 11 to generate a virtual viewpoint image at the before-movement viewpoint location A, and causes the image processing unit 12 to generate and output a synthesized image obtained by synthesizing an image for synthesis corresponding to the viewpoint location A on the virtual viewpoint image at the viewpoint location A.

Next, from time t2 to time t8, the behavior managing unit 13 causes the image generating unit 11 to generate virtual viewpoint images at the during-movement viewpoint locations $C_1$ to $C_6$, and causes the image processing unit 12 to output the virtual viewpoint images at the viewpoint locations $C_1$ to $C_6$ on which images for synthesis are not synthesized. In the example illustrated in FIG. 6, the viewpoint is changed every frame. Alternatively, the viewpoint may be changed every frames.

From time t2 to time t8, the image processing unit 12 stops the decompression process by the decompressing unit 34 and the synthesis process by the synthesis unit 35, and causes the synthesis unit 35 to output the virtual viewpoint images at the viewpoint locations $C_1$ to $C_6$ to the image quality adjustment processing unit 36 without synthesis, on the basis of the control from the behavior managing unit 13. As a result, the virtual viewpoint images at the viewpoint locations $C_1$ to $C_6$ on which images for synthesis are not synthesized are output from the image processing unit 12.

Next, at time t8, the behavior managing unit 13 causes the image generating unit 11 to generate and output to the image processing unit 12 a virtual viewpoint image at the viewpoint location B after the movement is stopped, and causes the image processing unit 12 to generate and output to the display device 4 a synthesized image obtained by synthesizing an image for synthesis corresponding to the viewpoint location B on the virtual viewpoint image at the viewpoint location B.

The image for synthesis corresponding to the viewpoint location B is generated by the image control device 2 and is output to the image processing device 3, before time t8 (for example, before time t2 or time t3). The behavior managing unit 13 controls the image processing unit 12, and thus causes the compressing unit 32 to compress data of the image for synthesis corresponding to the viewpoint location B output from the image control device 2 and then store the compressed data in the storage 33.

Then, the behavior managing unit 13 causes the decompressing unit 34 to decompress the compressed image data stored in the storage 33 and output the decompressed data to the synthesis unit 35, and at time t8, causes the synthesis unit 35 to synthesize the image for synthesis corresponding to the viewpoint location B on the virtual viewpoint image at the viewpoint location B. As a result, the synthesized image obtained by synthesizing the image for synthesis corresponding to the viewpoint location B on the virtual viewpoint image at the viewpoint location B can be output from the image processing unit 12.

The image processing unit 12 may previously acquire images for synthesis corresponding to viewpoint locations from the image control device 2 and store the images for synthesis in the storage 33. In this case, the behavior managing unit 13 can cause the decompressing unit 34 to acquire the images for synthesis corresponding to the viewpoint locations of the virtual viewpoint images from the storage 33, decompress the acquired images for synthesis, and output the decompressed data to the synthesis unit 35.

As described above, the image processing unit 12 displays synthesized images on the display device 4 when a virtual viewpoint image is images at viewpoint locations before and after the virtual viewpoint is moved, and displays virtual viewpoint images on the display device 4 in place of synthesized images when the virtual viewpoint image is images at viewpoint locations while the virtual viewpoint is moving. As a result, because the occupant of the vehicle does not visually recognize separately a virtual viewpoint image and an image for synthesis when a virtual viewpoint is moving, the occupant can easily grasp a sense of distance or the like on the basis of the virtual viewpoint image displayed on the display device 4.

Moreover, because the image processing unit 12 stops synthesizing a virtual viewpoint image and an image for synthesis when the virtual viewpoint image is images at viewpoint locations while the virtual viewpoint is moving, it is possible to reduce a processing load.

The image processing unit 12 synthesizes an image corresponding to a virtual viewpoint as an image for synthesis on an image at the virtual viewpoint. Therefore, because the occupant does not visually recognize simultaneously the virtual viewpoint image and the image for synthesis, of which the viewpoint location is sequentially changed together, it is easy to grasp a sense of distance or the like from the virtual viewpoint image, for example.

In the example described above, it has been explained that an image for synthesis is an image corresponding to a viewpoint location of a virtual viewpoint. However, the image for synthesis may not be sequentially changed in accordance with the change in the viewpoint location of the virtual viewpoint. Even in this case, because visibility is improved by not synthesizing an image for synthesis on a virtual viewpoint image of which the viewpoint location is sequentially changed, it is possible to more appropriately perform display using the virtual viewpoint image.

4. Image Processing of Image Processing Device 3

Next, image processing executed by the image processing device 3 will be explained with reference to FIG. 7. FIG. 7 is a flowchart illustrating an image processing procedure that is executed by the image processing device 3.

As illustrated in FIG. 7, the image generating unit 11 and the image processing unit 12 of the image processing device 3 perform an image acquisition process (Step S1). In the image acquisition process, the image generating unit 11 acquires a captured image from the image capturing device 1, and the image processing unit 12 acquires and stores an image for synthesis from the image control device 2.

Next, the image generating unit 11 converts the captured image acquired in Step S1 into a virtual viewpoint image by using a coordinate transformation process (Step S2). The behavior managing unit 13 determines whether a viewpoint location of a virtual viewpoint is moving (Step S3).

In Step S3, when it is determined that the viewpoint location of the virtual viewpoint is not moving (Step S3: No), the image processing unit 12 acquires the image for synthesis stored in Step S1 (Step S4), and performs a synthesis process (Step S5). The synthesis process is performed by synthesizing the image for synthesis acquired in Step S4 on the virtual viewpoint image generated in Step S2.

In Step S3, when it is determined that the viewpoint location of the virtual viewpoint is moving (Step S3: Yes) or when the process in Step S5 is terminated, the image processing unit 12 performs image quality adjustment on an image to be output to the display device 4 (Step S6), outputs the image after the image quality adjustment (Step S7), and terminates the process.

As described above, because the image processing device 3 according to the embodiment outputs a virtual viewpoint image to the display device 4 in place of a synthesized image when the virtual viewpoint image is images at viewpoint locations while the virtual viewpoint is moving, it is possible to decrease visibility of an image for synthesis and to appropriately perform display using the virtual viewpoint image.

In the embodiment described above, the image processing device 3 does not display an image for synthesis to zero visibility of the image for synthesis. However, the image processing device 3 may raise transmittance of the image for synthesis or lighten the color of the image for synthesis so as to decrease visibility of the image for synthesis.

For example, when a virtual viewpoint image is images at viewpoint locations while the virtual viewpoint is moving, the synthesis unit 35 can raise transmittance of images for synthesis corresponding to during-movement viewpoint locations or lighten the color of the images for synthesis, and then synthesize the images for synthesis on the virtual viewpoint images, respectively. Moreover, the image processing device 3 can synthesize a virtual viewpoint image on an image for synthesis so as to zero visibility of the image for synthesis.

In the embodiment described above, it has been explained that the image capturing device 1 is placed in the rear of the vehicle to capture the rear image of the vehicle by using the image capturing device 1. However, if the image capturing device 1 captures the peripheral image of the vehicle for drive assist, for example, the image capturing device 1 may have any arrangement and any imaging direction. Alternatively, image capturing devices may be arranged in the vehicle, and the image processing device 3 may generate a virtual viewpoint image on the basis of captured images output from the image capturing devices.

In the embodiment described above, it has been explained that the image processing device 3 is included in the on-vehicle apparatus 100 mounted on the vehicle as an example. However, the image processing device 3 may be an image processing device embedded in a smartphone or the like, for example.

In the embodiment described above, it has been explained that an image for synthesis is an image that acts as an index for drive assist as an example. However, the image for synthesis may be an image for raising the convenience of a user, for example.

In the embodiment described above, it has been explained that, when a virtual viewpoint is moving, synthesized images are output at viewpoint locations (start point and end point) of the virtual viewpoint, and synthesized images are not output at viewpoint locations between the start point and the end point. However, the application is not limited to the example.

For example, the image processing unit 12 may output synthesized image(s) at one or more viewpoint locations between the start point and the end point of the virtual viewpoint. In this case, because the occupant can fragmentally grasp the change of the image for synthesis, the occupant can easily grasp a sense of distance or the like on the basis of the virtual viewpoint image and also easily grasp the change in the location of the image for synthesis.

In the embodiment described above, it has been explained that one image for synthesis is synthesized on a virtual viewpoint image. However, images for synthesis of different types may be synthesized on virtual viewpoint images. In this case, when a virtual viewpoint image is images at viewpoint locations while the virtual viewpoint is moving, the image processing unit 12 decreases its visibility by not synthesize at least one of the images for synthesis of different types on the virtual viewpoint image, for example. Even in this case, it is possible to more appropriately perform display using virtual viewpoint images.

In this case, the image processing unit 12 can perform a synthesis process of a virtual viewpoint image and an image for synthesis by not making the image for synthesis stand out by using a process for lightening the color of the image for synthesis synthesized on the virtual viewpoint image, for example.

In the embodiment described above, it has been explained that the image processing device 3 generates information on the viewpoint locations $C_1$ to $C_n$ when acquiring information on the viewpoint location B as a movement destination. However, the viewpoint locations $C_1$ to $C_n$ may be generated by the image control device 2 and be output to the image processing device 3.

In the embodiment described above, it has been explained that the image processing device 3 stores an image for synthesis on which data compression is performed. However, the image processing device 3 may store an image for synthesis on which data compression is not performed.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An image processing device comprising a processor, the processor programmed to:
   generate an image viewed from a first viewpoint position based on a captured image of an image capturing unit including an image sensor;
   synthesize the generated image and an image for synthesis corresponding to the first viewpoint position so as to generate a synthesized image;
   when a virtual viewpoint moves from the first viewpoint position to a second viewpoint position with respect to a captured image of the image capturing unit, the second viewpoint position being different from the first viewpoint position, generate one or more images viewed from one or more virtual viewpoint positions between the first and second viewpoint positions;
   decrease visibility of one or more images for synthesis to be synthesized with the one or more images, the one or more images for synthesis corresponding to the one or more virtual viewpoint positions; and
   synthesize the one or more images and the one or more images for synthesis to generate synthesized images.

2. The image processing device according to claim 1, wherein the processor is further programmed to output to a display the synthesized images on which the one or more images for synthesis is not displayed to zero the visibility of the one or more images for synthesis, when the virtual viewpoint moves from the first viewpoint position to the second viewpoint position.

3. An image processing device comprising a processor, the processor programmed to:
   generate an image at a virtual viewpoint based on a captured image of an image capturing unit including an image sensor;
   generate an image in which an image for synthesis is displayed on the image at the virtual viewpoint; and
   when the image at the virtual viewpoint is an image at a viewpoint location of the virtual viewpoint while the viewpoint locating is moving with respect to a captured image of the image capturing unit, stops synthesizing the image at the virtual viewpoint and the image for synthesis so as to zero visibility of the image for synthesis, and outputs the image at the virtual viewpoint to a display.

4. The image processing device according to claim 1, wherein
the image capturing unit is placed on a vehicle, and captures and outputs a peripheral image of the vehicle as the captured image to the image processing device, and
the processor is further programmed to synthesize as the one or more images for synthesis one or more images of a guideline that indicates a predicted running path of the vehicle on the one or more images viewed from the one or more virtual viewpoint positions.

5. An image processing method comprising:
   generating an image viewed from a first viewpoint position based on a captured image of an image capturing unit including an image sensor; and
   synthesizing the generated image and an image for synthesis corresponding to the first viewpoint position so as to generate a synthesized image;
   when a virtual viewpoint moves from the first viewpoint position to a second viewpoint position with respect to a captured image of the image capturing unit, the second viewpoint position being different from the first viewpoint position, generating one or more images viewed from one or more virtual viewpoint positions between the first and second viewpoint positions;
   decreasing visibility of one or more images for synthesis to be synthesized with the one or more images, the one or more images for synthesis corresponding to the one or more virtual viewpoint positions; and
   synthesizing the one or more images and the one or more images for synthesis to generate synthesized images.

6. An on-vehicle apparatus comprising:
   a display that displays an image thereon;
   an image capturing unit that captures a peripheral image of a vehicle and outputs a captured image, the image capturing unit including an image sensor; and
   a processor programmed to:
     generate an image viewed from a first viewpoint position based on the captured image of the image capturing unit;
     synthesize the generated image and an image for synthesis corresponding to the first viewpoint position so as to generate a synthesized image;
     when a virtual viewpoint moves from the first viewpoint position to a second viewpoint position with respect to a captured image of the image capturing unit, the second viewpoint position being different from the first viewpoint position, generate one or more images viewed from one or more virtual viewpoint positions between the first and second viewpoint positions;
     decrease visibility of one or more images for synthesis to be synthesized with the one or more images, the one or more images for synthesis corresponding to the one or more virtual viewpoint positions;
     synthesize the one or more images and the one or more images for synthesis to generate synthesized images; and
     output the generated synthesized images to the display.

* * * * *